(12) United States Patent
Jadhav

(10) Patent No.: US 10,814,794 B1
(45) Date of Patent: Oct. 27, 2020

(54) COMPACT TRACTOR FRONT TOOL BOX

(71) Applicant: DEERE & COMPANY, Moline, IL (US)

(72) Inventor: Vikas Jadhav, Sanpada (IN)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 16/414,436

(22) Filed: May 16, 2019

(51) Int. Cl.
*B60R 9/06* (2006.01)
*B60R 11/06* (2006.01)
*B62D 49/00* (2006.01)

(52) U.S. Cl.
CPC ............... *B60R 9/065* (2013.01); *B60R 11/06* (2013.01)

(58) Field of Classification Search
CPC ................................ B60R 9/065; B60R 11/06
USPC ................ 224/42.37, 42.4; 410/91; 220/810; 248/312.1, 311.2
See application file for complete search history.

(56) References Cited

U.S. PATENT DOCUMENTS

| | | | |
|---|---|---|---|
| 1,859,331 A | 5/1932 | Heaslet | |
| 2,464,224 A * | 3/1949 | Grabert | B60R 9/06 254/8 R |
| 2,747,780 A | 5/1956 | Puddy | |
| 2,981,554 A * | 4/1961 | Mulder | B60R 11/06 280/164.1 |
| 3,614,136 A | 10/1971 | Dent | |
| 4,138,152 A | 2/1979 | Prue | |
| 5,080,250 A * | 1/1992 | Dickinson | B60R 9/00 220/608 |
| 5,165,645 A * | 11/1992 | Brown | B60N 3/103 248/310 |
| 5,364,142 A | 11/1994 | Coiner | |
| 5,598,961 A * | 2/1997 | Sills | B60R 9/00 224/404 |
| 5,601,206 A * | 2/1997 | Haas | B60R 9/00 16/254 |
| 6,595,397 B2 | 7/2003 | Teich | |
| 6,666,362 B1 * | 12/2003 | LeTrudet | B60P 7/13 224/42.4 |
| 6,755,428 B2 * | 6/2004 | Butler | A45C 9/00 280/47.26 |
| 7,204,538 B2 * | 4/2007 | Warlick, III | B60P 3/36 224/488 |
| 7,306,270 B2 | 12/2007 | Helms et al. | |
| 8,011,704 B2 | 9/2011 | Nees et al. | |
| 8,083,111 B2 | 12/2011 | Lase | |
| 8,205,773 B2 * | 6/2012 | Timmer | F41H 7/00 224/400 |
| 8,646,668 B2 * | 2/2014 | Oakes | B60R 9/065 224/401 |

(Continued)

OTHER PUBLICATIONS

John Deere, New Front-Mounted Tractor Toolbox Offered by John Deere, dated Mar. 24, 2014, 2 pages.

*Primary Examiner* — Justin M Larson

(57) ABSTRACT

A compact tractor front tool box includes a support frame positioned between a left frame side rail and a right frame side rail of the tractor, a box-shaped housing that removably fits through a hole in the support frame, a rim extending outwardly from the box-shaped housing that rests on the support frame, and a plurality of vertically oriented pins on the support frame that align with and extend through holes in the rim. A plurality of clips engage the pins to hold the box-shaped housing in the support frame, and disengage the pins to remove the box-shaped housing from the support frame.

10 Claims, 3 Drawing Sheets

(56) References Cited

U.S. PATENT DOCUMENTS

| | | | | |
|---|---|---|---|---|
| 8,820,598 | B2 * | 9/2014 | Tennyson | B60R 9/065 |
| | | | | 224/509 |
| 9,180,820 | B2 | 11/2015 | Klein et al. | |
| 9,650,085 | B2 * | 5/2017 | Wilson | B60R 5/045 |
| 10,018,408 | B2 * | 7/2018 | Murphy | A45C 11/20 |
| 10,112,545 | B1 * | 10/2018 | Gaskins | B60R 9/065 |
| D872,007 | S * | 1/2020 | Muilenburg | D12/423 |
| 10,611,312 | B1 * | 4/2020 | Sullivan | B60D 1/025 |
| 2002/0014506 | A1 | 2/2002 | Teich | |
| 2006/0261111 | A1 * | 11/2006 | McCoy | B60R 9/065 |
| | | | | 224/499 |
| 2009/0205847 | A1 | 8/2009 | Benoit et al. | |
| 2010/0236955 | A1 * | 9/2010 | Lase | B60R 11/06 |
| | | | | 206/373 |
| 2018/0340356 | A1 * | 11/2018 | Brennan | E05B 73/00 |
| 2019/0283684 | A1 * | 9/2019 | Singer | B60J 7/1621 |

\* cited by examiner

COMPACT TRACTOR FRONT TOOL BOX

FIELD OF THE INVENTION

This invention relates generally to tool boxes on compact utility tractors.

BACKGROUND OF THE INVENTION

Compact utility tractors, or compact tractors, are typically used by property owners, landscape contractors, small-scale farmers, equine operators, or other vocations, and have up to about 65 horsepower. Because of their relatively small, compact size, however, it can be difficult to find good locations with adequate space for tool boxes. Tool boxes on the rear of compact tractors (on the ROPs, for example) may block rear visibility, may not be compatible with back hoe space requirements, or may not be compatible with cab space requirements. Tool boxes on the sides of compact tractors (on or adjacent the operator console, for example) may be very limited in size or may not be compatible with other tractor features. Tool boxes on the front of compact tractors may not be compatible with tractor attachments such as front loaders, front hitches, front PTO implements, mid lift system front mechanisms, of front weights.

There is a need for a tool box for a compact utility tractor that is adequately sized, compatible with various attachments mounted to the tractor, easily accessible to the operator, easily removable, and may be secured and locked.

SUMMARY OF THE INVENTION

A compact tractor front tool box includes a box-shaped housing, a shelf extending outwardly from the box-shaped housing and having a pair of holes extending therethrough, a lip extending upwardly from the shelf; and a cover hinged to the shelf and extending over the box-shaped housing, the shelf and the pair of holes in a closed position. The shelf may rest on a support frame having a pair of vertically oriented pins corresponding to the pair of holes. The box-shaped housing is removable from the support frame. The compact tractor front tool box is adequately sized, compatible with various attachments mounted to the tractor, easily accessible to the operator, easily removable, and may be secured and locked on the tractor.

DESCRIPTION OF THE PREFERRED EMBODIMENT

Figure 1:
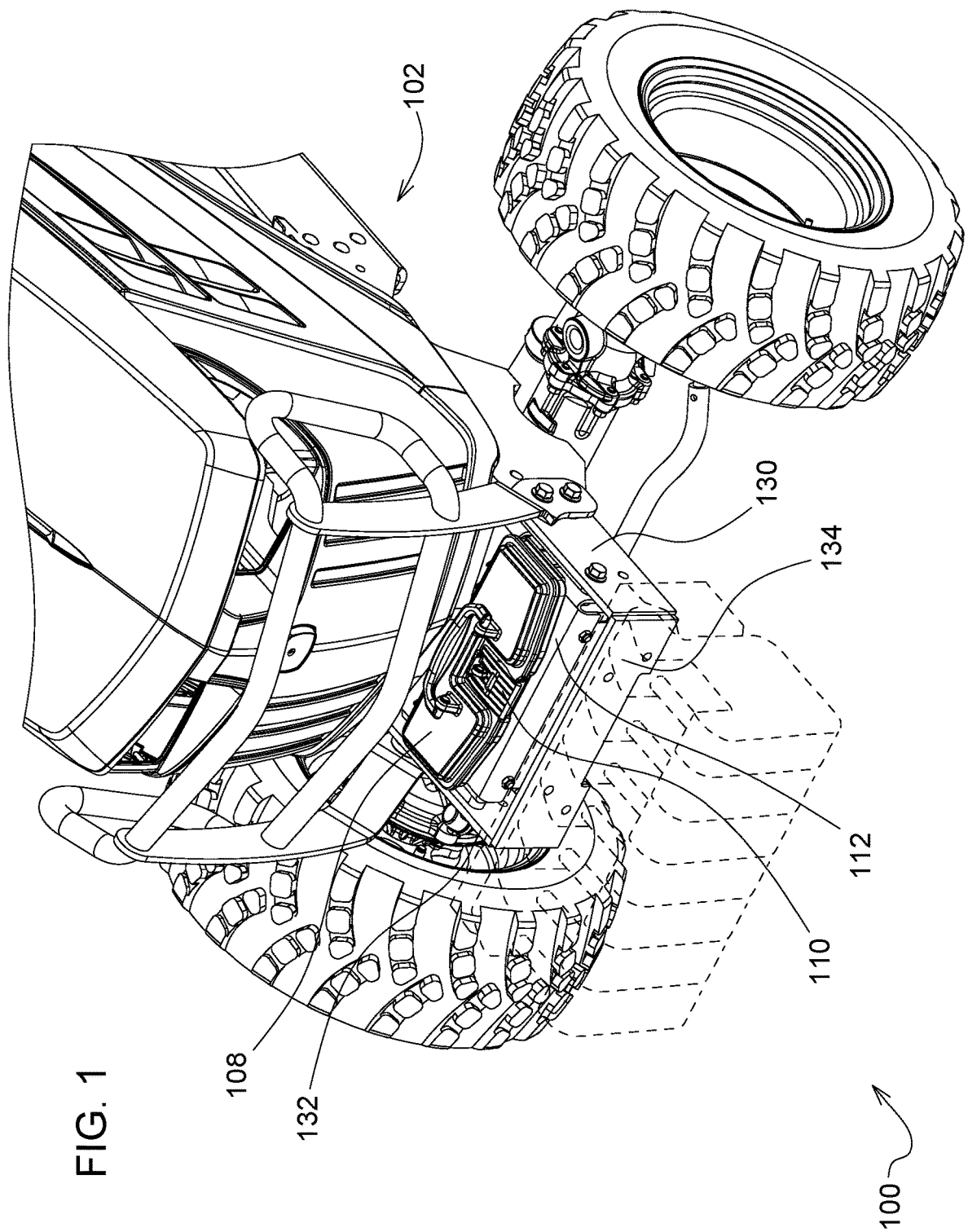
FIG. 1 is a front perspective view of a compact tractor front tool box that is on the tractor according to a first embodiment of the invention.
Figure 2:
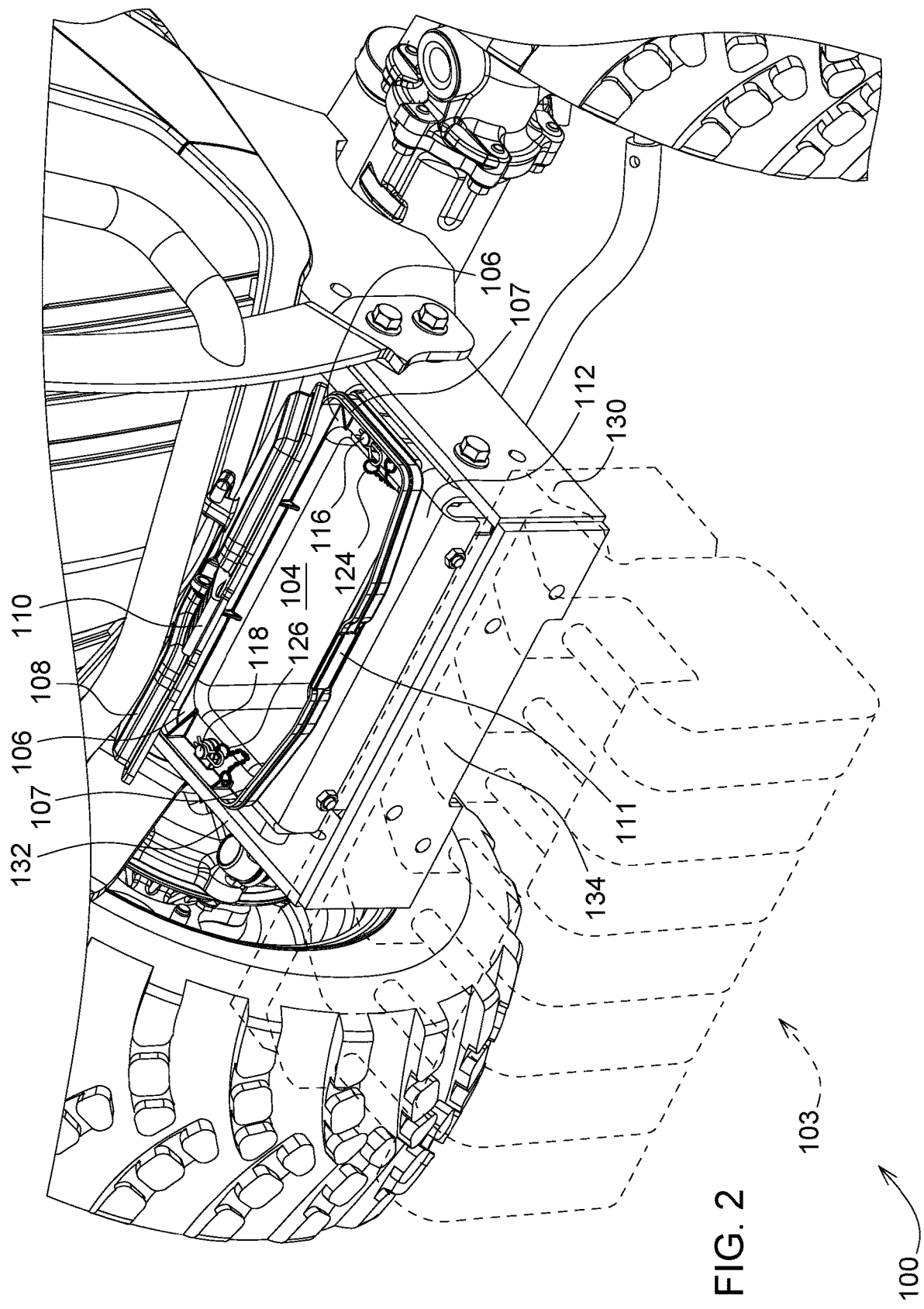
FIG. 2 is a front perspective view of a compact tractor front tool box that is on the tractor and open according to a first embodiment of the invention.
Figure 3:
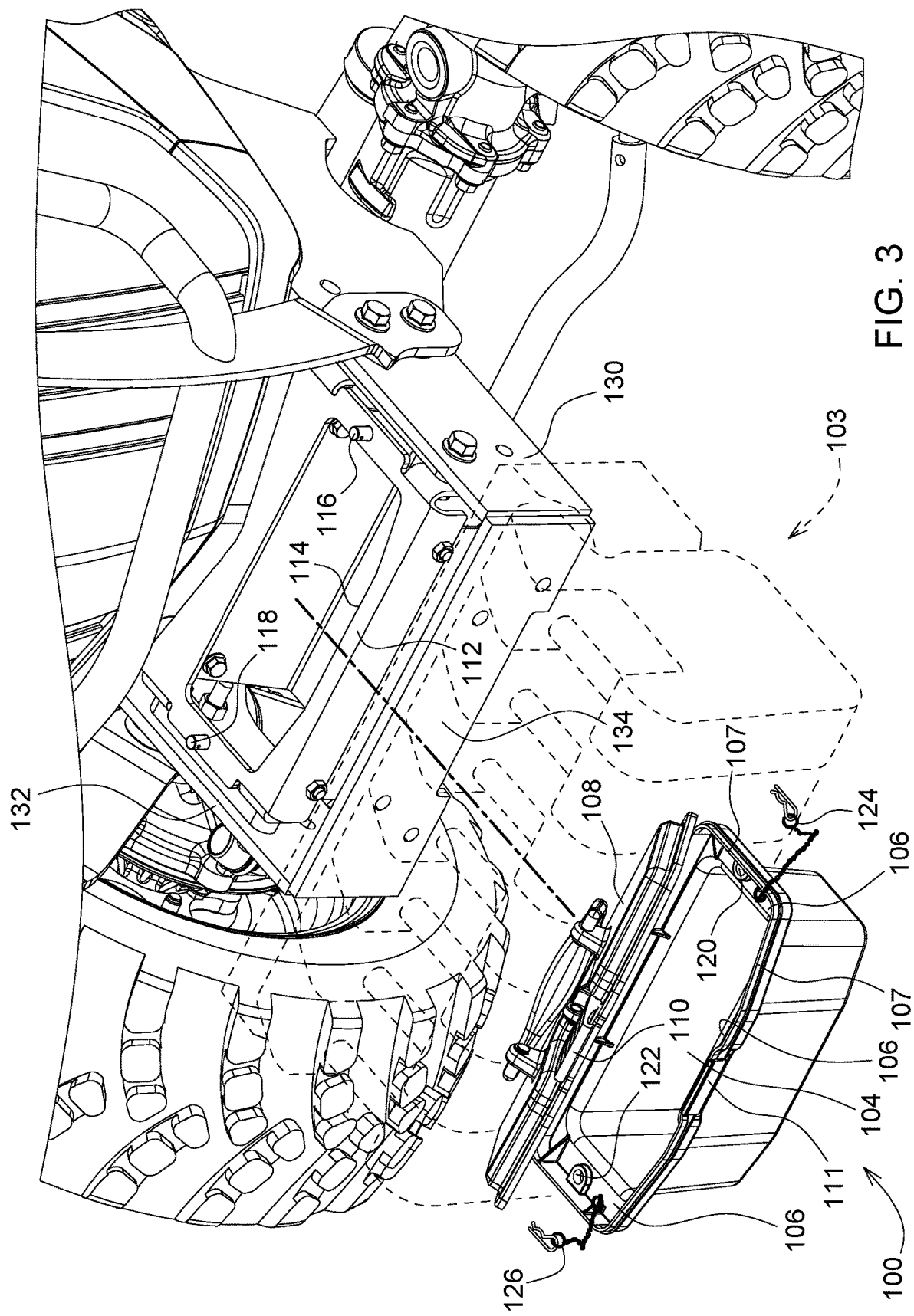
FIG. 3 is a front perspective view of a compact tractor front tool box that is off the tractor and open according to a first embodiment of the invention.

FIGS. 1-3 show a preferred embodiment of compact tractor front tool box 100 on compact utility tractor 102. The compact tractor is shown with front weights 103. The compact tractor front tool box may include box-shaped housing or cavity 104 and rim or shelf 106 extending outwardly from the top of the housing and on all sides of the housing, and lip 107 extending vertically up at the outer perimeter or edge of the rim or shelf. The compact tractor front tool box also may include cover 108 which may be hinged to rim or shelf 106, and latch 110 which may be moved horizontally to engage and disengage catch strip 111 on lip 107. Latch 110 also may be locked in the engaged position when the cover is closed.

In one embodiment, as shown in FIGS. 2 and 3, compact tractor front tool box 100 may include support frame 112 holding and supporting the compact tractor front tool box in place on the front of the tractor. Box-shaped housing or cavity 104 of the compact tractor front tool box may be dimensioned to fit inside opening 114 in support frame 112, and rim or shelf 106 may rest on support frame 112. Pins 116, 118 may extend vertically up from the left and right ends of support frame 112. Corresponding holes 120, 122 may extend through rim or shelf 106 at each end of the compact front tool box. As the compact tractor front tool box is placed on support frame 112, pins 116, 118 may align with and extend through holes 120, 122. Clips 124, 126 then may be used to engage the upper ends of pins 116, 118 (through holes in the pins, for example) to lock the tool box on the tractor. Clips 124, 126 may remain in the compact tractor front tool box (and/or may be tethered to the inside of the housing or to the shelf of the tool box, for example) when the tool box is off the tractor. Cover 108 extends outwardly over the box-shaped housing, and over the rim or shelf, where it contacts lip 107. Cover 108 also extends over holes 120, 122, upper ends of pins 116, 118, and clips 124, 126. As a result, the compact tractor front tool box may be removed from the support frame when cover 108 is unlatched and opened, and clips 124, 126 are disengaged from pins 116, 118. In other words, the compact front tool box is portable and may be carried away from the compact tractor once clips 124, 126 are disengaged.

In one embodiment, support frame 112 may be attached to left and right frame side rails 130, 132 where the side rails extend forwardly of the tractor front axles. The same side rails also may extend rearwardly behind the front axles to provide structural support for the engine and operator station of the tractor. Support frame 112 also may be positioned behind front frame cross member 134. As a result, side rails 130, 132 and cross member 134 may help protect the compact tractor front tool box, and make the tool box compatible with attachments mounted or extending forwardly of the tractor frame, such as: front loaders and parking stands, front hitches, front PTO implements, mid lift system front mechanisms and front weights. For example, front weights 103 are shown mounted to front frame cross member, forwardly of the tool box.

Having described the preferred embodiment, it will become apparent that various modifications can be made without departing from the scope of the invention as defined in the accompanying claims.

The invention claimed is:

1. A compact tractor front tool box comprising:
a support frame positioned between a left frame side rail and a right frame side rail;
a box-shaped housing that removably fits through a hole in the support frame;
a rim extending outwardly from the box-shaped housing that rests on the support frame; and
a plurality of vertically oriented pins on the support frame that align with and extend through holes in the rim.

2. The compact tractor front tool box of claim 1 further comprising a plurality of clips that engage the vertically oriented pins to hold the box-shaped housing in the support frame; and disengage the vertically oriented pins to remove the box-shaped housing from the support frame.

3. The compact tractor front tool box of claim 1 further comprising a cover with a latch that is horizontally movable to engage and disengage the rim.

4. The compact tractor front tool box of claim 3 further comprising a plurality of clips that are tethered inside the tool box.

5. A compact tractor front tool box, comprising:
   a box-shaped housing;
   a shelf extending outwardly from the box-shaped housing and having a pair of holes extending therethrough;
   a lip extending upwardly from the shelf; and
   a cover hinged to the shelf and extending over the box-shaped housing, the shelf and the pair of holes in a closed position.

6. The compact tractor front tool box of claim 5, further comprising a pair of clips tethered inside the box-shaped housing.

7. The compact tractor front tool box of claim 6 further comprising a latch that is horizontally movable to engage and disengage a catch strip on the lip.

8. A compact tractor front tool box, comprising:
   a support frame attached between a pair of frame side rails and having a pair of vertical pins extending upwardly therefrom;
   a box-shaped housing with an outwardly extending shelf resting on the support frame and having a pair of holes that the vertical pins extend through;
   a pair of clips engaging the vertical pins that extend through the holes to hold the box-shaped housing to the support frame; and
   a hinged cover on the box-shaped housing that is openable to provide access to the box-shaped housing to disengage the clips to remove the box-shaped housing from the support frame.

9. The compact tractor front tool box of claim 8 further comprising a horizontally movable latch on the hinged cover.

10. The compact tractor front tool box of claim 8 further comprising a lip extending up from the shelf.

* * * * *